US009766672B2

(12) United States Patent
Morgan et al.

(10) Patent No.: US 9,766,672 B2
(45) Date of Patent: Sep. 19, 2017

(54) SYSTEM FOR MANAGING POWER PROVIDED TO A PROCESSOR OR MEMORY BASED ON A MEASURED MEMORY CONSUMPTION CHARACTERISTIC

(71) Applicant: Intel Corporation, Santa Clara, CA (US)

(72) Inventors: Bryan C. Morgan, Leominster, MA (US); Priya N. Vaidya, Shrewsbury, MA (US); Premanand Sakarda, Acton, MA (US); Marlon A. Moncrieffe, Leominster, MA (US)

(73) Assignee: Intel Corporation, Santa Clara, CA (US)

( * ) Notice: Subject to any disclaimer, the term of this patent is extended or adjusted under 35 U.S.C. 154(b) by 716 days.

(21) Appl. No.: 13/847,036

(22) Filed: Mar. 19, 2013

(65) Prior Publication Data

US 2014/0108830 A1    Apr. 17, 2014

Related U.S. Application Data

(63) Continuation of application No. 13/171,157, filed on Jun. 28, 2011, now Pat. No. 8,402,293, and a
(Continued)

(51) Int. Cl.
*G06F 1/00* (2006.01)
*G06F 1/26* (2006.01)
*G06F 1/32* (2006.01)

(52) U.S. Cl.
CPC .............. *G06F 1/26* (2013.01); *G06F 1/3203* (2013.01); *G06F 1/3246* (2013.01);
(Continued)

(58) Field of Classification Search
CPC ......... G06F 1/26; G06F 1/3203; G06F 1/3246
(Continued)

(56) References Cited

U.S. PATENT DOCUMENTS 4,601,008 A   7/1986 Kato
5,630,148 A   5/1997 Norris
(Continued)

OTHER PUBLICATIONS

Office Action Received for Chinese Patent Application No. 200810189708.0, mailed on Jul. 20, 2010, 4 pages of Office Action and 5 pages of English Translation.
(Continued)

*Primary Examiner* — Robert Cassity
(74) *Attorney, Agent, or Firm* — Schwabe, Williamson & Wyatt, P.C.

(57) ABSTRACT

In one embodiment, an electronic apparatus comprises at least one processor and a computer readable medium coupled to the processor and comprising logic instructions encoded in the computer readable medium, wherein the instructions, when executed in a processing system, cause the processing system to perform operations comprising initializing a direct memory access profiler in an electronic system, wherein the direct memory access is coupled to a policy manager in the electronic system, measuring at least one memory consumption characteristic of the electronic system, communicating the at least one memory consumption characteristic to a policy manager of the electronic system, and using the at least one memory consumption characteristic to adjust a power state of the electronic system.

19 Claims, 4 Drawing Sheets

Related U.S. Application Data continuation of application No. 12/006,064, filed on Dec. 28, 2007, now Pat. No. 7,971,084.

(52) U.S. Cl.
CPC ........ *G06F 1/3275* (2013.01); *Y02B 60/1225* (2013.01); *Y02B 60/1228* (2013.01)

(58) Field of Classification Search
USPC .......................................................... 713/323
See application file for complete search history.

(56) References Cited

U.S. PATENT DOCUMENTS

| | | | |
|---|---|---|---|
| 5,765,209 A | 6/1998 | Yetter | |
| 6,092,180 A | 7/2000 | Anderson et al. | |
| 6,178,481 B1* | 1/2001 | Krueger | G06F 12/0888 711/122 |
| 6,571,333 B1 | 5/2003 | Jain et al. | |
| 6,574,739 B1* | 6/2003 | Kung et al. | 713/322 |
| 6,895,520 B1 | 5/2005 | Altmejd et al. | |
| 7,079,904 B1 | 7/2006 | Forstrom et al. | |
| 7,111,179 B1 | 9/2006 | Girson et al. | |
| 7,218,566 B1 | 5/2007 | Totolos, Jr. et al. | |
| 7,346,787 B2 | 3/2008 | Vaidya et al. | |
| 7,971,084 B2 | 6/2011 | Morgan et al. | |
| 2002/0026493 A1* | 2/2002 | Scardamalia | G06F 13/1663 709/213 |
| 2003/0134632 A1 | 7/2003 | Loughran | |
| 2004/0230739 A1* | 11/2004 | Tsern et al. | 711/105 |
| 2005/0049729 A1 | 3/2005 | Culbert et al. | |
| 2005/0138442 A1* | 6/2005 | Keller, Jr. | G06F 1/3203 713/300 |
| 2006/0020765 A1 | 1/2006 | Mahrla et al. | |
| 2006/0123253 A1* | 6/2006 | Morgan et al. | 713/300 |
| 2008/0148083 A1 | 6/2008 | Pesavento et al. | |

OTHER PUBLICATIONS

Office Action Received for U.S. Appl. No. 12/006,064 mailed on Sep. 24, 2010, 6 Pages.
Notice of Allowance Received for U.S. Appl. No. 12/006,064 mailed on Feb. 24, 2011, 5 Pages.
Notice of Allowance Received for Chinese Patent Application No. 200810189708.0, mailed on Aug. 25, 2011, 2 pages of Notice of Allowance and 2 pages of English Translation.
Office Action Received for the Taiwanese Patent Application No. 097147666, mailed on May 22, 2012, 4 pages of Office Action and 4 pages of English Translation.
Archer, Tom; "Managed Extensions:Tracking User Idle Time Without Hooks",Oct. 4, 2004, Available at <http:// www.developer.com/ net/cplus/article.php/3416271/Managed-Extensions-Tracking-User-Idle-Time-Without-Hooks.htm> 4 pages.
"Intel PXA27X Processor Family", Optimization Guide, Aug. 2004, 148 pages.
"Optimization Technology for the Intel PXA27X Processor Family", 2004, 14 pages.
"Performance Profiling Techniques on Intel Xscale Microarchitecture Processors", Application Note, Aug. 2002, 58 pages.
"ACPI Overview", 10 pages.
"Wireless Intel Speedstep Power Manager, Optimization Power Consumption for the Intel PXA27x Processer Family", 2004, 16 pages.
Office Action received for the U.S. Appl. No. 13/171,157, mailed on Apr. 16, 2012, 6 pages.
Office Action received for the U.S. Appl. No. 13/171,157, mailed on Jul. 31, 2012, 6 pages.
Notice of Allowance received for U.S. Appl. No. 13/171,157, mailed on Nov. 13, 2012, 7 pages.
Supplemental Notice of Allowance received for U.S. Appl. No. 11/007,098, mailed on Aug. 4, 2010, 23 pages.
Office Action received for the U.S. Appl. No. 11/007,098, mailed on Mar. 31, 2009, 41 pages.
Office Action received for the U.S. Appl. No. 11/007,098, mailed on Dec. 15, 2009, 24 pages.
Office Action received for the U.S. Appl. No. 11/006,917, mailed on Apr. 26, 2007, 16 pages.
Notice of Allowance received for U.S. Appl. No. 11/006,917, mailed on Oct. 16, 2007, 7 pages.
Notice of Allowance received for U.S. Appl. No. 11/007,098, mailed on Jun. 11, 2010, 5 pages.
Weinberg, Bill, "Montavista Linux Consumer Electronics Edition", 2003.
"How to use the system utility to configure the PMU on Intel PCA", Available at <www.intel.com/cd/ids/developer/asmo-na/eng/microprocessors/pca/knowledgebase/169101.htm>.
"Intel PCA Power Management Software Design Guide", Sep. 4, 2004, Available at <ftp;//download.intel.com/pca/ developernetwork/doc/25179701.pdf>.
"Intel XPA27X Processor Reference Plateform (Rev.1.4)", Jun. 2004, Available at <fto://download.intel.com/design/pca/applicationsprocessors/schemes/27887706. pdf>.
Notice of Allowance Received for Tiwanese Patent Application No. 097147666, mailed on Aug. 25, 2011, 2 pages of Notice of Allowance only.

* cited by examiner

SYSTEM FOR MANAGING POWER PROVIDED TO A PROCESSOR OR MEMORY BASED ON A MEASURED MEMORY CONSUMPTION CHARACTERISTIC

RELATED APPLICATIONS

This application is a Continuation of U.S. patent application Ser. No. 13/171,157, filed on Jun. 28, 2011, and entitled "POWER MANAGEMENT IN ELECTRONIC SYSTEMS" and now U.S. Pat. No. 8,402,293, issued Mar. 19, 2013, which is a continuation of U.S. patent application Ser. No. 12/006,064, filed on Dec. 28, 2007, and entitled "POWER MANAGEMENT IN ELECTRONIC SYSTEMS" and now U.S. Pat. No. 7,971,084 issued Jun. 28, 2011, which is related to the following co-pending applications: U.S. Ser. No. 11/007,098 to Morgan, et al, entitled SYSTEM AND METHOD FOR ADAPTIVE POWER MANAGEMENT, and U.S. Ser. No. 11/006,917 to Vaidya, et al, entitled SYSTEM AND METHOD FOR ADAPTIVE POWER MANAGEMENT.

BACKGROUND

Many purchasers, users, and manufacturers of computer products are becoming increasingly sensitive to issues of power consumption. In some cases, consumers desire to lower their energy bills. Consumers may also prefer processing systems that generate less noise and heat, and there is typically a positive relationship between the amount of power consumed by a processing system and the amounts of noise and heat generated by that processing system. In addition, for a battery powered processing system such as a laptop computer, a cellular telephone ("cell phone"), a personal digital assistants (PDAs), etc., reducing the power consumption has the valuable effect of increasing the processing system's battery life (i.e., increasing the amount of time the processing system can be used before the battery must be recharged or replaced with a fresh battery).

A typical processing system includes many different components, such as a processor or microprocessor, a data storage device, and various input/output (I/O) devices. When a processing system is not off, each component within the processing system may consume some power. The terms "system power state" and "global power state" both refer to the aggregate power consumption of all of the components in a processing system. The term "device power state" refers to the power consumption of a particular component.

Typically, the processor is one of the most significant consumers of power in a processing system. The term "processor power state" refers specifically to the power consumption of a processor or microprocessor.

One approach to managing performance is to use a static prediction of performance needs. For instance, a developer of an end user application may initially determine through experimentation that certain functions or tasks of the application typically require a certain amount of processing power. The result of the experimentation may be considered static profiling information. The developer may then design the application to modify the performance level of the processing system before executing those functions or tasks. Such a software application thus manages the system performance based on the predicted needs.

Also, an operating system (OS) may schedule and run software entities such as processes, threads, and tasks, and the scheduler in the OS may include an application programming interface (API) that provides loading information pertaining to those processes, threads, and tasks. Other software programs can call that API to retrieve the loading information. The loading information may include, for instance, the total number of active processes, threads, and tasks. The programs that may obtain loading information from the OS scheduler may include power management software or debugging software, for example.

Static techniques for managing power present many disadvantages. For example, in a typical case, development of the software application will be made more difficult, because expected processing power requirements must be predicted by the developer, based on the previous analysis done, and then handled within the application. Furthermore, the predicted processing power requirements may differ substantially from the actual processing power requirements. Also, when a developer is attempting to design an application to handle the expected processing power requirements, the tools available for that application for modifying the system's performance level may be limited to the tools provided by a particular OS. This same limitation may apply to programs that obtain loading information from an OS API. Further, static analysis may not yield adequate power savings.

BRIEF DESCRIPTION OF THE DRAWINGS

The detailed description is described with reference to the accompanying figures.

DETAILED DESCRIPTION

Described herein are exemplary systems and methods to implement power management electronic systems. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments Intel Corporation manufactures processors that incorporate technologies to support low power consumption and high performance processing for a wide range of services. In some cases, the technologies in those processors for supporting low power consumption and high performance processing may be referred to in general as Intel XScale™ technology. Intel Corporation currently distributes one or more families of processors that feature Intel XScale™ technology under various product designations or model numbers, such as the Intel™ PXA26x and the Intel™. PXA27x product families.

Example embodiments illustrated herein may include processing systems with processors that support Intel™ PCA. Alternative embodiments of the present invention include processing systems with other kinds of processors, whether manufactured by Intel Corporation or other manufacturers. As described in greater detail below, the example embodiment includes a processor with dynamic voltage management (DVM) and dynamic frequency management (DFM) capabilities.

Figure 1:
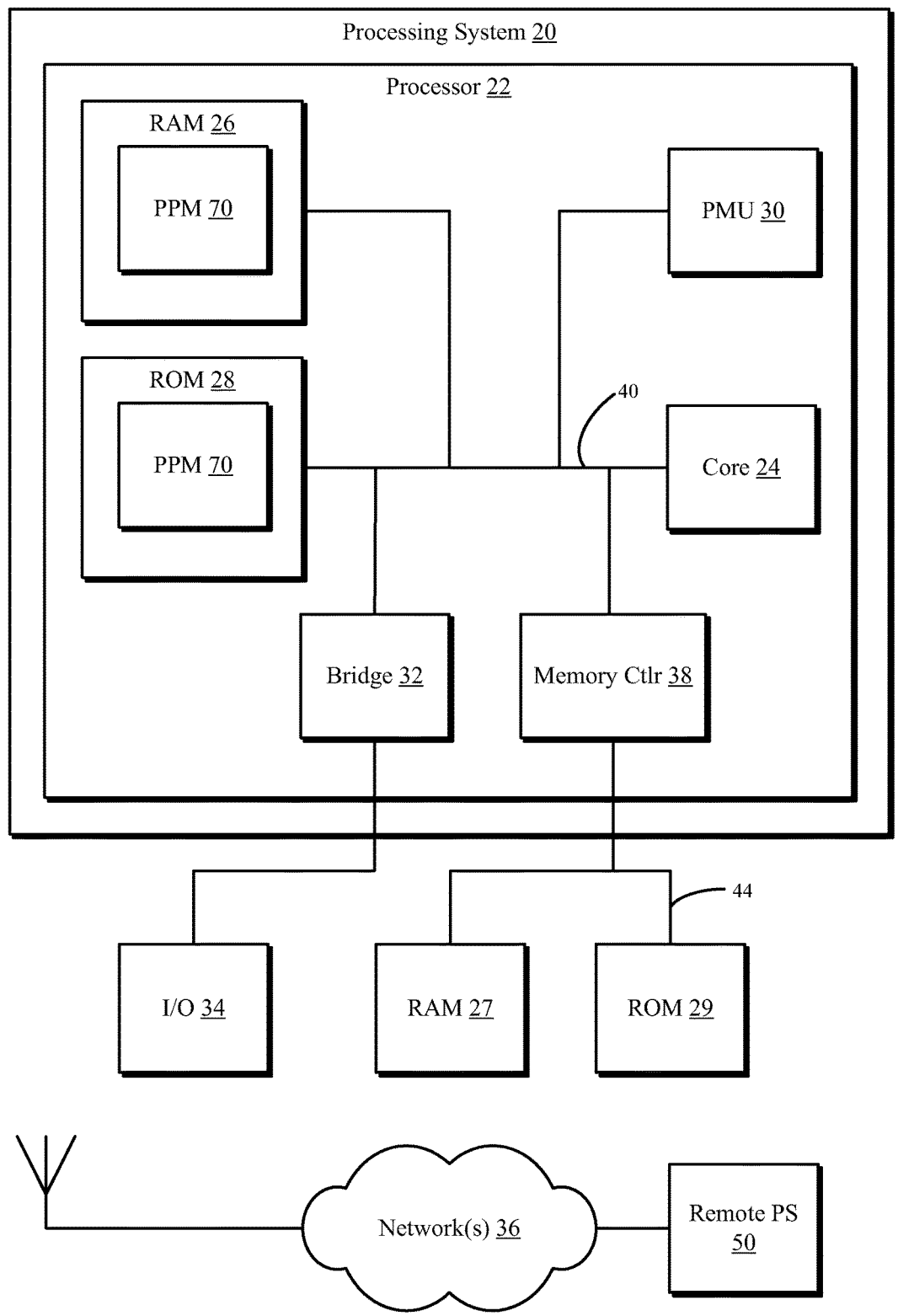
FIG. 1 is a block diagram depicting an example embodiment of a suitable data processing environment in which certain aspects of an example embodiment of the present invention may be implemented.

FIG. 1 is a block diagram depicting an example embodiment of a suitable data processing environment in which certain aspects of an example embodiment of the present invention may be implemented. FIG. 1 and the following discussion are intended to provide a general description of a suitable environment in which certain aspects of the present invention may be implemented. As used herein, the terms "processing system" and "data processing system" are intended to broadly encompass a single machine, or a system of communicatively coupled machines or devices operating together. Exemplary processing systems include, without limitation, distributed computing systems, supercomputers, computing clusters, mainframe computers, mini-computers, client-server systems, personal computers, workstations, servers, portable computers, laptop computers, tablet processing systems, telephones, personal digital assistants (PDAs), handheld devices, mobile handsets, entertainment devices such as audio and/or video devices, and other devices for processing or transmitting information.

The data processing environment of FIG. 1, for example, may include a processing system 20 that includes one or more processors or central processing units (CPUs) 22 communicatively coupled to various other components via one or more buses or other communication conduits or pathways. CPU 22 may be implemented as an integrated circuit. The components coupled to CPU 22 may include one or more volatile or non-volatile data storage devices, such as random access memory (RAM) 27 and read-only memory (ROM) 29. A memory bus 44 may serve to couple RAM 27 and ROM 29 with CPU 22. For purposes of this disclosure, the term "ROM" may be used in general to refer to non-volatile memory devices such as erasable programmable ROM (EPROM), electrically erasable programmable ROM (EEPROM), flash ROM, flash memory, etc. CPU 22 may also be communicatively coupled to mass storage devices, such as one or more integrated drive electronics (IDE) drives, small computer systems interface (SCSI) drives, or other types of hard disk drives. Other types of mass storage devices and storage media that may be used by processing system 20 may include floppy disks, optical storage, tapes, memory sticks, digital video disks, biological storage, etc.

The components of processing system 20 that are communicatively coupled to processor 22 may also include one or more bus bridges. One or more of those bridges and associated buses may be used to connect processor 22, either directly or indirectly, with additional components, such as one or more storage devices, device controllers, input/output (I/O) ports, and I/O devices 34. For example, the additional components may include a video controller, a SCSI controller, a network controller, a universal serial bus (USB) controller, a keyboard controller, etc. In some embodiments, such components may be implemented as embedded devices, using components such as programmable or non-programmable logic devices or arrays, application-specific integrated circuits (ASICs), embedded computers, smart cards, and the like.

In some embodiments, processor 22 may be implemented as an integrated circuit (IC) that includes a processing core 24, as well as control circuits or control logic for implementing additional components. Such components may include an on-chip bus bridge 32, on-chip RAM 26, on-chip ROM 28, a performance monitoring unit (PMU) 30, and a memory controller 38. The IC may also feature one or more internal bus bridges and/or internal buses, such as system bus 40, for interconnecting various components within processor 22.

Processing system 20 may be controlled, at least in part, by input from conventional input devices, such as a keyboard or keypad, a pointing device, etc., and/or by directives received from one or more remote data processing systems 50, interaction with a virtual reality (VR) environment, biometric feedback, or other input sources or signals. Processing system 20 may send output to components such as a display device, remote data processing system 50, etc. Communications with remote data processing system 50 may travel through any suitable communications medium. Processing systems may be interconnected by way of a physical and/or logical network 36, such as a local area network (LAN), a wide area network (WAN), an intranet, the Internet, a public switched telephone network (PSTN), a cellular telephone network, etc. Communications involving network 36 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including instructions, functions, procedures, data structures, application programs, etc. which when accessed by a machine result in the machine performing tasks or defining abstract data types or low-level hardware contexts. The data may be referred to in general as software, and it may be stored in volatile and/or non-volatile data storage.

For example, ROM 28 may include at least portions of a software application 70 for monitoring the performance of processing system 20 and managing the power consumption of processing system 20. Software application 70 may also be referred to as platform power manager (PPM) 70. In an example embodiment, PPM 70 may include instructions and other data for implementing the functionality described herein. As indicated by the dashed box in RAM 26, some or all of PPM 70 may be loaded into RAM 26, for example in connection with a boot process for processing system 20. In one embodiment, PPM 70 may then cause processing system to operate as described below. In alternative embodiments, processing system 20 may obtain PPM 70 from one or more other sources, such as ROM 29 and/or remote data processing system 50, and some or all of PPM 70 may be loaded into RAM 27.

Figure 2:
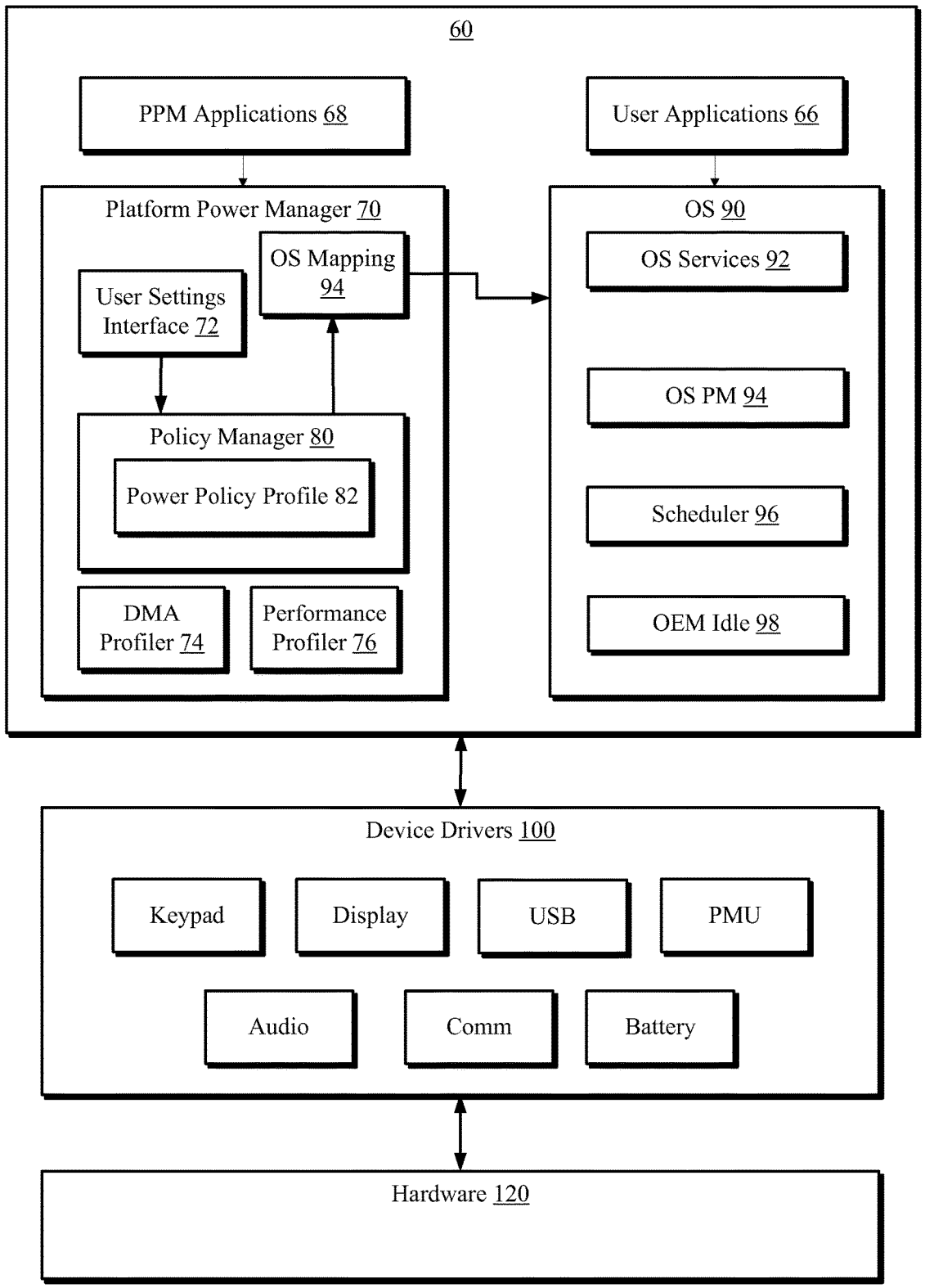
FIG. 2 is a block diagram depicting software components for managing power in a processing system, in accordance with an example embodiment of the present invention.

FIG. 2 is a block diagram of a power management architecture 60, in accordance with an example embodiment of the present invention. As illustrated, power management architecture 60 includes PPM 70, which, from a logical perspective, resides above the hardware 120 of processing system 20, and above the device drivers 100 which serve as low-level software interfaces to various hardware components.

In the example embodiment, power management architecture 60 also includes an operating system (OS) 90 and user applications 66. Power management architecture 60 may also include one or more power management applications 68 which interact with PPM 70, as described in greater detail below. OS 90 may include code for various OS services 92 and a task scheduler 96. OS 90 may also include power management (PM) software 94 for implementing certain power management features. In the example embodiment, OS 90 also includes a sequence of instructions for causing processing core 24 to enter and exit idle mode. Such a sequence of instructions may be referred to as original equipment manufacturer (OEM) idle code 98, idle execution path 98, or simply idle path 98.

In the example embodiment, task scheduler 96 keeps track of which processes or tasks are currently running, and OS 90 executes idle path 98 whenever no processes or tasks are ready to run. In the example embodiment, OS 90 uses a variable duration idle, which exits in response to an event such as an interrupt. In alternative embodiments, the OS can use a fixed duration idle. The present invention may also be used in systems that do not use a thread or other dispatchable entity to implement the idle path.

In the example embodiment, PPM 70 includes various modules for monitoring system performance, modifying system power consumption, and performing related functions. As described in greater detail below, those modules may include a power policy manager 80, a user settings interface 72, a DMA profiler 74, a performance profiler 76, and an OS mapping module 78. Power policy manager 80 may also be referred to as policy manager 80. The different modules may communicate with each other through any suitable mechanisms, such as application programming interfaces (APIs) for example.

In the example embodiment, device drivers 100 register with PPM 70 through the device driver APIs. Consequently, device drivers 100 may receive notification from PPM 70 on all of the power management events, such as state transitions, frequency changes, and voltage changes. If a particular operating state is supported by OS 90, then PPM 70 may use the OS interface to notify device drivers 100. Otherwise, PPM 70 may use an independent interface between device drivers 100 and PPM 70. When a device driver receives a callback for a power management state transition or event, the device driver may transition into its new state and prepare the device for the next state. As an example, when a keypad driver transitions into a standby state, the keypad driver may configure the low-level registers so that the keypad driver can wakeup from standby state if the user presses the key on the keypad.

Device drivers 100 may also include logic for requesting a state change from PPM 70. For example, a battery driver may communicate with PPM 70 to request a reduced operating point for processing system 20, to reduce power consumption in response to determining that the charge level of the system's battery has fallen below a predetermined threshold.

PPM 70 may use its own services or services from OS 90 to dynamically scale power and performance. For example, if OS 90 supports two different performance modes identified as "run" and "idle," PPM 70 may use services of OS 90 to enter those performance modes. In addition, as described in greater detail below, PPM 70 may recognize or create additional performance modes, and PPM 70 may use its own services (e.g., services for communicating with PMU 30) to enter those modes.

OS mapping module 78 includes resources for interfacing with one or more individual OSs. OS mapping module 78 thus provides a layer of abstraction between policy manager 80 and OS 90. Consequently, PPM 70 may be used with a different OS by simply replacing OS mapping module 78, modifying OS mapping module 78, or using different resources of OS mapping module 78.

Figure 3:
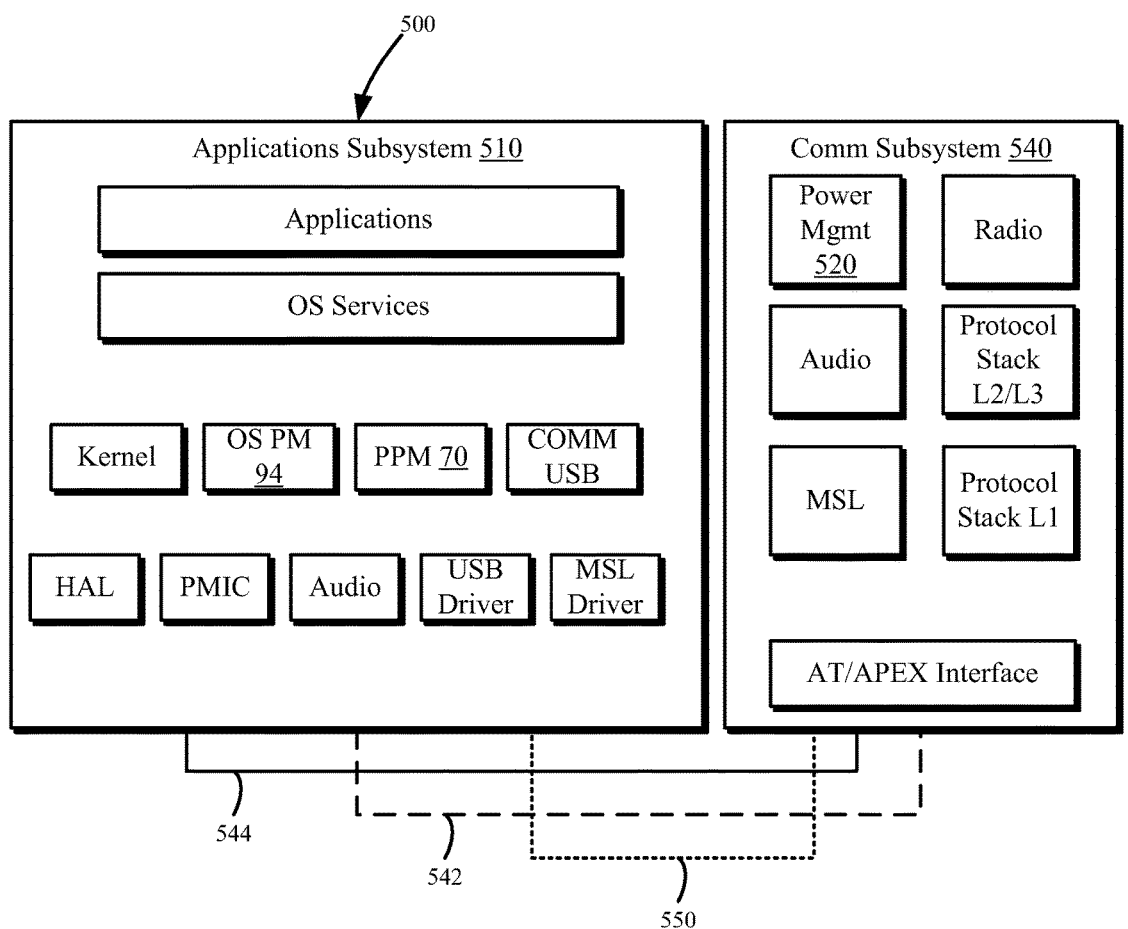
FIG. 3 is a block diagram depicting software and hardware components in a processing system with communications capabilities, in accordance with an example embodiment of the present invention.

FIG. 3 is a block diagram depicting software and hardware components in a processing system 500 with communications capabilities, in accordance with an example embodiment of the present invention. In particular, processing system 500 includes an applications subsystem 510 and a communications subsystem 540. Processing system 500 may also include a mobile scalable link (MSL) 550 to support communications between applications subsystem 510 and communications subsystem 540. Additional communication paths may also be provided, such as a serial link 552 and a serial small computer systems interface (SCSI) protocol (SSP) link 554.

Communications subsystem 540 may include various software components, such as a communications power management module (CPMM) 520, various protocol stack layers, and an MSL interface. CPMM 520 may handle power management for communications subsystem 540, and CPMM 520 may maintain its own state machine. CPMM 520 may interface to the different layers of the protocol stack. In addition, CPMM may support different power modes, such as a run duty cycle and a low power duty cycle, with different states for functions such as a global positioning system (GPS) and/or communications using technology such as a Global System for Mobile Communications (GSM) protocol.

Applications subsystem 510 may include software such as PPM 70 and OS power manager 94 for managing power in processing system 500. Applications subsystem 510 may also include a hardware abstraction layer (HAL) and various communications device drivers, such as power management IC (PMIC), audio, universal serial bus (USB), and MSL device drivers. The communications device drivers may operate as clients of PPM 70 and/or OS power manager 94, and those device drivers may receive notifications from PPM 70 and/or OS power manager 94 on appropriate state transitions. For example, when the OS goes into the standby mode, OS power manager 94 may notify one or more of the communications drivers about this state change. In response, communications subsystem 540 may enter a low power standby state, and, in conjunction with entering that state, may prepare itself for waking up applications subsystem 510, in case communications subsystem 540 subsequently transitions into a new state that requires processing on applications subsystem. 510. Communications between applications subsystem 510 and communications subsystem 540 may transpire as signaling events over a communications path such as MSL 550, general purpose I/O (GPIO) pins, or any other suitable path.

For dynamic performance and power scaling such as that described below, PPM 70 may also notify communications subsystem 540 about frequency and/or voltage changes via a communications device driver such as the MSL driver. CPMM 520 may then notify the communications software accordingly, thereby increasing the effectiveness of the power management approach, relative to a system that does not notify its communications subsystem regarding one or more types of power or performance changes in the applications subsystem. Thus, dynamic, system-level power management may be achieved, rather than simply application-level or communications-level power management.

Figure 4:
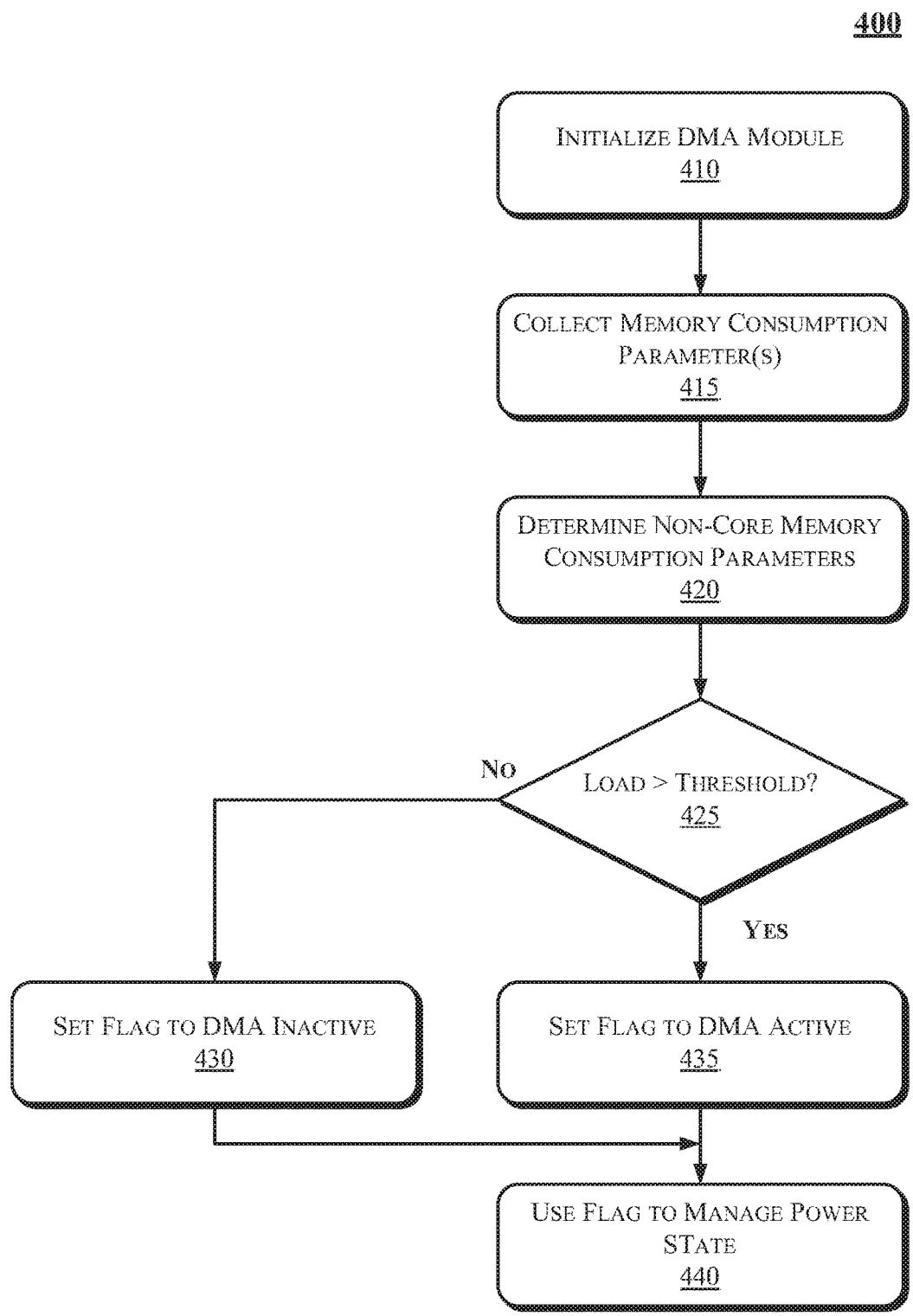
FIG. 4 is a flowchart illustrating operations a method to manage power in a processing system, in accordance with an example embodiment of the present invention.

FIG. 4 is a flowchart illustrating operations a method to manage power in a processing system, in accordance with an example embodiment of the present invention. When processing system 20 boots, processing system 20 may automatically load PPM 70. PPM 70 may do is to load a power policy profile 82 into policy manager 80 from nonvolatile storage, such as ROM 28 or ROM 29, for example. Power policy profile 82 may include various configuration settings for various components of PPM 70, such as one or more processor utilization thresholds, one or more performance thresholds, and one or more policy entries that may link certain operating states with corresponding platform reconfiguration directives, as described in greater detail below. Power policy profile 82 may represent or encode an overall power management policy for processing system 20.

Each of the configuration settings may be provided with PPM 70 as default value, or may be supplied or modified by a user such as a vendor, a system administrator, an end user, etc. Thus, as described below, PPM 70 may receive a user specified policy setting for processing system 20, and may update power policy profile 82, based at least in part on that policy setting. In one embodiment, some or all of the values in power policy profile 82 are developed through experimentation for a particular hardware configuration, OS, and typical workload. Experimentation may be used to develop suitable values for other hardware configurations, OSs, and workloads.

Referring to FIG. 4, at operation 410 the DMA profiler 74 may be initialized by launching DMA profiler 74. The process of launching DMA profiler 74 may include the operation of associating a callback routine with idle path 98 of OS 90. A hardware abstraction layer (HAL) or any other suitable technique may be used to associate DMA profiler 74 with idle execution path 98. For instance, PPM 70 may insert the callback routine into an interrupt service routine (ISR) associated with entering and/or exiting the processor idle mode.

DMA profiler 74 may set a sampling period, for example based on a default or user defined setting. DMA profiler 74 may then collect direct memory access data by measuring memory consumption (i.e., load) characteristics in various system locations such as, e.g., on a data bus, on a dynamic memory controller (DMC) and on a peripheral bus (PxBus). DMA profiler 74 may also collect data on cache accesses and cache misses. The sampling period may be static or dynamic.

At the end sampling period, DMA profiler 74 may determine non-core memory consumption parameters, i.e., what portion of the DMA activity is attributable to non-core activities such as, e.g., audio or video playback. For example, in some embodiments DMA profiler may measure memory consumption parameters in various locations when the system is not executing non-core activities such as, e.g., audio or video playback. These memory consumption parameters may be stored in a suitable memory location. Memory consumption parameters collected during the sampling period may be compared with the stored parameters to determine an approximation of the memory consumption attributable to non-core activities. For example, the memory consumption parameters stored in memory may be subtracted from the memory parameters measured during the sampling period.

If, at operation 425, the non-core memory consumption parameters (i.e., the load due to non-core operations) exceeds a threshold, then control passes to operation 435 and the DMA profiler 74 sets a flag in memory which indicates that the device is operating in a DMA Active mode. By contrast, if at operation 425 the load does not exceed the threshold, then control passes to operation 430 and DMA profiler 74 sets a flag in memory which indicates that the device is operating in a DMA Inactive mode.

Control then passes to operation 440 and the flag is used to manage a power state of the electronic device. For example, in some embodiments, the platform power manager 70 may use the flag to scale voltage and frequency dynamically in response to changes in the DMA load on the system. Further, the policy manager 80 can use the DMA profiler data to keep track of DMA requirements on system throughput and can re-adjust the system setting etc. to ensure that the data rate for DMA is maintained for required system functionality and performance.

Some of the operations described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" "some embodiments" or "an embodiment" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
a processor having a core that is to access memory, the processor including logic to monitor at least a selected one of signal content of a data bus or a peripheral bus for one or more memory access parameters to characterize memory consumption and manage power consumption, the logic including a performance monitoring unit (PMU) to measure a memory consumption characteristic indicative of a load of at least one of the data bus or the peripheral bus;
wherein the processor is to manage power provided to the at least one of the processor or the memory based on the memory consumption characteristic.

2. The apparatus of claim 1, in which the logic is to use the memory consumption characterization to adjust a power state of the core.

3. The apparatus of claim 1, in which the logic is to use the memory consumption characterization to adjust a power state of the memory.

4. The apparatus of claim 1, in which the memory consumption characterization is to be used to determine a core utilization parameter.

5. The apparatus of claim 4, in which the logic is to provide the core utilization parameter to a power manager.

6. The apparatus of claim 1, in which the one or more memory access parameters include at least one of a number of cache accesses or a number of cache misses.

7. The apparatus of claim 1, in which the one or more memory access parameters include one or more main memory access parameters.

8. The apparatus of claim 1, in which the processor is to communicate the memory consumption characteristic to a policy manager.

9. The apparatus of claim 1, in which the logic is implemented outside of the core.

10. The apparatus of claim 1, in which the logic is implemented by the core.

11. The apparatus of claim 1, in which the logic is to monitor a dynamic memory controller for the one or more memory access parameters, and the memory consumption characteristic is indicative of a load of the dynamic memory controller.

12. The apparatus of claim 11, in which at least one of the one or more memory access parameters comprise a DMA (direct memory access) parameter.

13. An apparatus, comprising:
a memory; and
a processor coupled to the memory, the processor having a core that is to access the memory, the processor to monitor a memory controller for one or more memory access parameters, to perform a memory characterization responsive to said determined parameters to ascertain a core utilization parameter to be used to adjust a power state of the core;
in which the one or more memory access parameters comprise a DMA (direct memory access) parameter.

14. The apparatus of claim 13, in which the one or more memory access parameters include at least one of a number of cache accesses or a number of cache misses.

15. The apparatus of claim 13, in which the processor includes a performance monitoring unit (PMU) to provide core utilization information.

16. The apparatus of claim 13, in which the one or more memory access parameters include one or more main memory access parameters.

17. The apparatus of claim 13, in which the processor is to communicate at least one of the one or more memory consumption parameters to a policy manager.

18. The apparatus of claim 13, in which the processor is to use the memory characterization to adjust a power state of the memory.

19. The apparatus of claim 13, in which the processor is to monitor at least a selected one of signal content of a data bus or a peripheral bus for the one or more memory access parameters.

* * * * *